No. 819,285. PATENTED MAY 1, 1906.
F. B. JONES.
UNIVERSALLY ADJUSTABLE CLAMP BRACKET.
APPLICATION FILED NOV. 4, 1905.

2 SHEETS—SHEET 1.

Witnesses:
Franklin E. Low.
William C. Flass.

Inventor:
Frederick B. Jones
by his attorney,
Charles S. Gooding.

No. 819,285. PATENTED MAY 1, 1906.
F. B. JONES.
UNIVERSALLY ADJUSTABLE CLAMP BRACKET.
APPLICATION FILED NOV. 4, 1905.
2 SHEETS—SHEET 2.
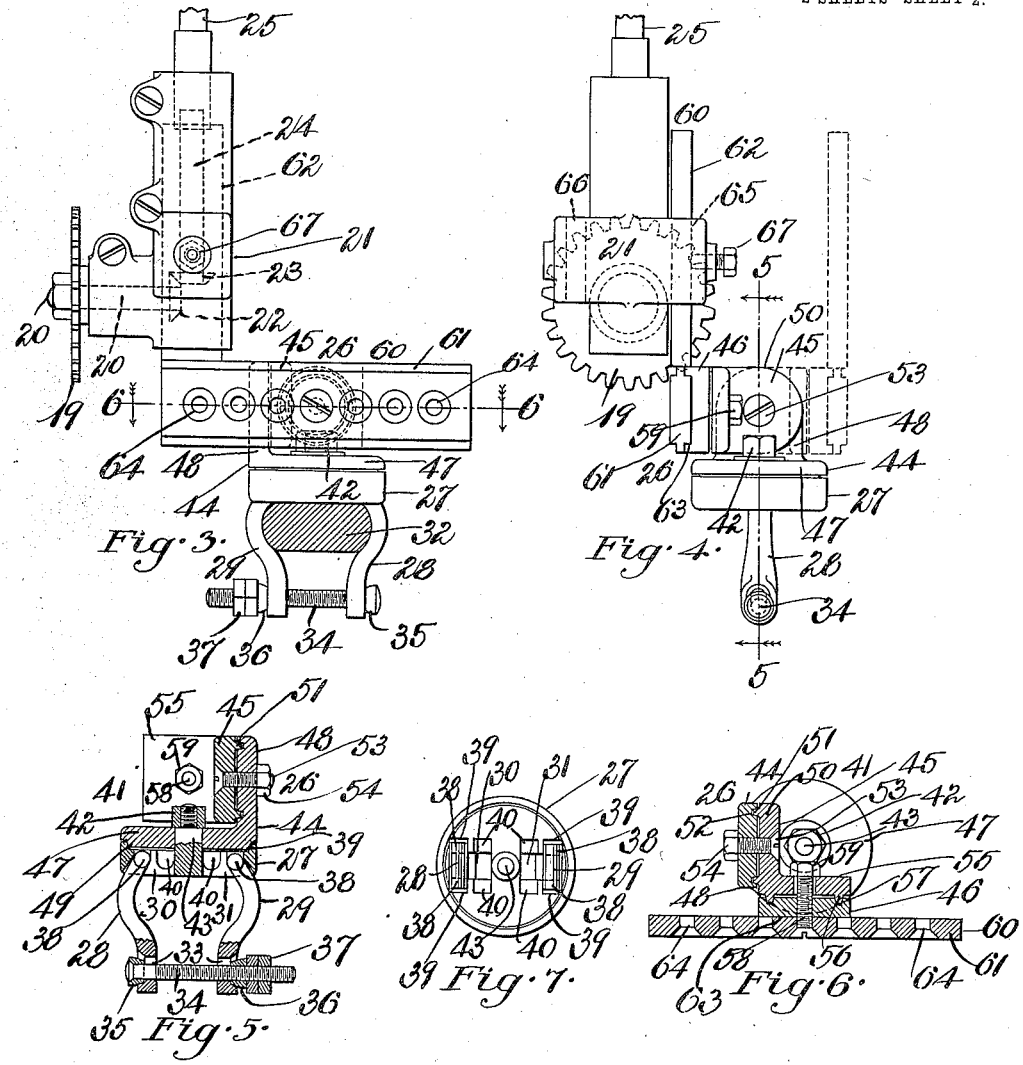

UNITED STATES PATENT OFFICE.

FREDERICK B. JONES, OF SOMERVILLE, MASSACHUSETTS, ASSIGNOR TO WARNER INSTRUMENT COMPANY, OF BELOIT, WISCONSIN, A CORPORATION OF WISCONSIN.

UNIVERSALLY-ADJUSTABLE CLAMP-BRACKET.

No. 819,285.     Specification of Letters Patent.     Patented May 1, 1906.

Application filed November 4, 1905. Serial No. 285,824.

*To all whom it may concern:*

Be it known that I, FREDERICK B. JONES, a citizen of the United States, residing at Somerville, in the county of Middlesex and State of Massachusetts, have invented new and useful Improvements in Universally-Adjustable Clamp-Brackets, of which the following is a specification.

This invention relates to an adjustable fitting or bracket adapted to be fastened to the steering-knuckle of an automobile for the purpose of supporting a pinion in alinement with a gear fast to one of the front wheels of said automobile, said pinion being connected by suitable gearing and shafting to a speed or distance registering device attached to the dashboard of the automobile. As the steering-knuckles for different automobiles vary greatly in style, size, and shape, it is essential that the supporting-bracket for said pinion should be adjustable in all directions in order that said pinion may be brought into proper mesh and into correct alinement with said gear. Otherwise it is necessary to construct a special fitting which can be fastened to the axle-lever of the steering-knuckle of the particular automobile to which said registering device is to be attached. This necessitates the making of measurements, a scale drawing, patterns, castings, and special fittings, involving a great deal of expense, time, and trouble, which is entirely eliminated by the use of my improved universally-adjustable bracket.

The object of this invention is therefore to provide a bracket which is capable of being attached to an automobile steering-knuckle and which can be adjusted in different directions, as hereinafter described, so as to bring a pinion mounted thereon into mesh with and into alinement with a gear fast to one of the front wheels of the automobile and which after being so adjusted can be firmly fastened to said lever and the different parts thereof rigidly clamped one to the other, so that the pinion will be maintained constantly in perfect alinement with said gear regardless of the jarring to which it may be subjected.

The invention consists, in a device of the character described, of the combination and arrangement of parts set forth in the following specification and particularly pointed out in the claims thereof.

Figure 1:
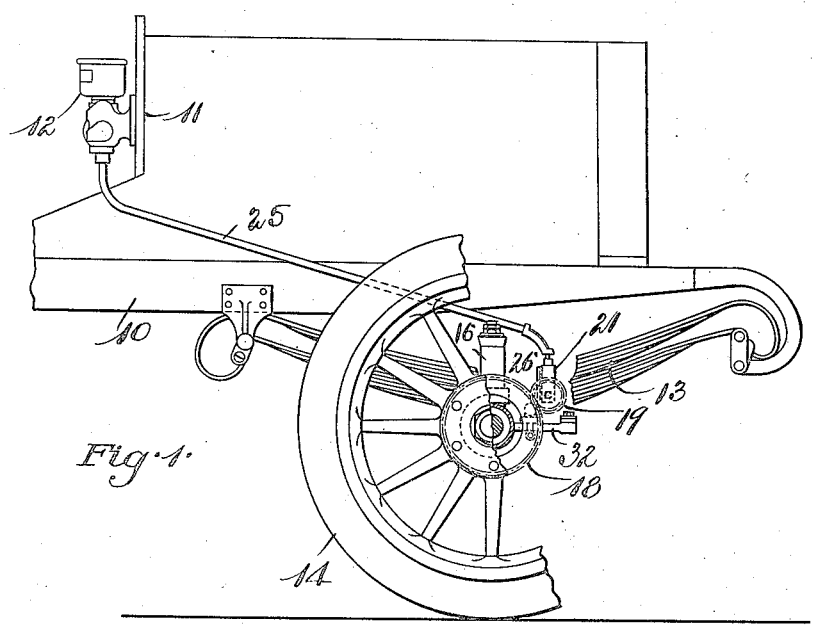
Figure 2:
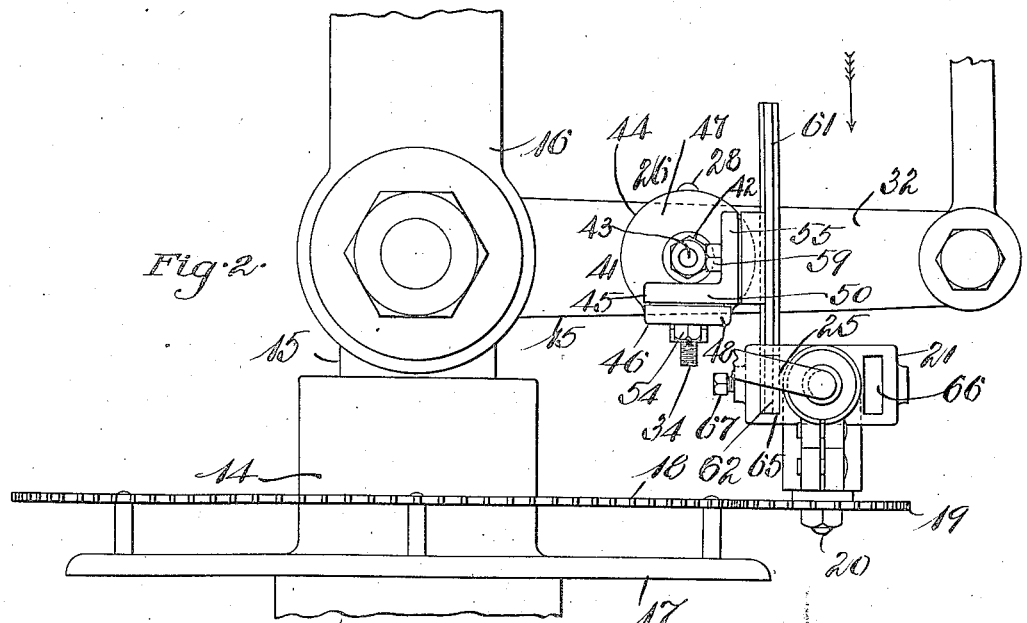

Referring to the drawings, Figure 1 is a side elevation, partly broken away for the purpose of illustration, of a portion of the front wheel and body of an automobile, illustrating my improved universally-adjustable clamp-bracket attached to the steering-knuckle, a portion of the wheel shown in section. Fig. 2 is a plan view of the steering-knuckle with my improved bracket attached thereto. Fig. 3 is a front elevation of said bracket, showing the same attached to the lever of the steering-knuckle, said lever being shown in section, and the pinion-gear, with its casing, supported upon said bracket. Fig. 4 is a side elevation of the part illustrated in Fig. 3 as viewed from the right in said figure or in the direction of the arrow, Fig. 2. Fig. 5 is a section, partly in elevation, taken on line 5 5 of Fig. 4. Fig. 6 is a section, partly in elevation, taken on line 6 6 of Fig. 3. Fig. 7 is a detail plan of the base of said bracket with the standard and other parts removed.

Like numerals refer to like parts throughout the several views of the drawings.

In the drawings, 10 is the frame or body of the automobile; 11, the dashboard; 12, a distance and speed measuring device attached to said dashboard; 13, the springs; 14, the steering-wheel, and 15 the steering-knuckle.

16 is the front axle, and 17 a plate fastened to the steering-wheel 14, and 18 a gear fast to said plate 17. A pinion 19, Fig. 3, meshes into the gear 18 and is fast to a shaft 20, journaled to rotate in a gear-casing 21 and having attached to the end thereof opposite from that to which the pinion 19 is fastened a bevel-gear 22, which meshes into another bevel-gear 23, fast to a vertical shaft 24, also journaled in said gear-casing, connected to a flexible shaft 25, said flexible shaft being connected to the driving-shaft of the meter 12.

My improved bracket 26 consists of a cylindrical base 27, having two arms 28 29 pivoted thereto and extending downwardly therefrom through slots 30 and 31, respectively. The arms 28 and 29 are curved to fit the lever 32 of the steering-knuckle 15 and are each provided at its lower end with a slot 33, through which a bolt 34 projects. Said bolt 34 has a conical-shaped washer 35 at one end thereof, and at the opposite end from said washer another conical washer 36 is provided. These conical washers fit in conical-shaped recesses formed upon the outer sides of the arms 28 and 29 adjacent to the slots 33, and said arms are drawn toward each other by the nuts 37, which have screw-threaded engagement with the bolt 34. The upper ends of the arms 28 and 29 are each provided with lateral projections 38, extending across the slots 30 and 31, respectively, and projecting into recesses 39 39 or 40 40, formed in the base 27. It will be seen that by moving the arms 28 29 from the position illustrated in Fig. 7, where the projections 38 project into recesses 39 inwardly toward the center of said base-plate until the projections 38 upon said arms rest in the recesses 40 in said base-plate, a bodily adjustment of the arms toward each other at their upper ends may be obtained independently of the adjustment of said arms toward each other by means of the screw-bolt 34 and the nuts 37 thereon.

A standard 41 is fastened to the base-plate 27 by a nut 42, which has screw-threaded engagement with a stud 43 integral with said base-plate. The standard 41 is made in three parts 44, 45, and 46. The part 44 consists of a circular plate 47, having an ear 48 extending upwardly therefrom, the plate 47 being fitted with a conical-shaped projection 49, which projects downwardly into a corresponding recess formed in the top of the base-plate 27, so that when the nut 42 is screwed up the part 44 is clamped to the base-plate 27, and when said nut is loosened said part 44 may be rotated upon the base-plate 27 to any desired position. For instance, in Fig. 4 said part 44 is illustrated in dotted lines as rotated through an angle of one hundred and eighty degrees and the holder 60, attached thereto, also illustrated in dotted lines.

The part 45 is a right-angle piece consisting of a leg 50, provided with an annular rib 51, which fits into an annular groove 52, formed in the part 44. The parts 44 and 45 are clamped together by a bolt 53 and nut 54. From this construction it will be evident that the part 45 is rotatable upon the part 44 and may be rigidly clamped thereto by means of the nut 54 and bolt 53 in any desired position. The leg 55, forming a portion of the part 45, has also an annular rib 56 thereon, which projects into an annular groove 57, formed in the part 46, and the part 45 is clamped to the part 46 by the bolt 58 and nut 59. By this construction it will be evident that the part 46 may be rotated upon the part 45 into any desired position and when adjusted to the position desired clamped to the part 45 by means of the nut 59 and bolt 58. A holder 60 is also fastened to the part 46 by the bolt 58. Said holder is preferably formed as a right-angle piece having two arms 61 and 62. The arm 61 is grooved longitudinally thereof to fit in ways 63, formed in the part 46, and said horizontal arm 61 is also provided with a series of countersunk holes 64, adapted to receive the bolt 58. It will be seen that when the nut 59 is tightened the parts 45 and 46 and the holder 60 are rigidly fastened together. The vertical arm 62 of the holder 60 is adapted to project through either of the holes 65 or 66, formed in the gear-casing 21, and said gear-casing may be raised or lowered upon the arm 62 and rigidly fastened in the desired position by means of a set-screw 67.

In the use of my improved universally-adjustable clamp-bracket the base-plate 27 and the parts carried thereby are fastened to the lever 32 by screwing up the nuts 37, and thus clamping the arms 28 and 29 against the opposite sides, respectively, of said lever. If it is desired to raise or lower the pinion 19, it may be done by raising or lowering the gear-casing 21 upon the vertical arm 62 of the holder 60 and then when the desired height is obtained setting said gear-casing rigidly with relation to said holder by means of the set-screw 67. If it is desired to move the pinion 19 longitudinally of the axle 16 toward or away from the wheel 14, this adjustment may be made by loosening the nut 59 and sliding the horizontal arm 61 in the desired direction toward or away from the wheel 14 and then clamping the arm 61 and parts 45 and 46 together by means of the nut 59 and bolt 58. When it is desired to tip the pinion 19 at different angles, either in a horizontal or vertical plane in order that said pinion may aline correctly with the gear, such adjustment may be obtained by rotating the standard as a whole about the stud 43, tipping the part 46 upon the part 45 around the bolt 58 as a center or by tipping the part 45 upon the part 44 around the bolt 53 as a center. Thus it will be seen that my improved bracket possesses the advantage of being universally adjustable, so that the pinion 19 can be universally adjusted with relation to the gear 18, and thus fit all varying sizes and forms of steering-knuckles on different classes and designs of automobiles, and also said pinion can be adjusted to mesh into different diameters of steering-wheel gears.

Having thus described my invention, what I claim, and desire by Letters Patent to secure, is—

1. A bracket comprising a base, a plurality of arms, each of said arms projecting through a slot provided in said base and having a lateral projection upon each of its opposite sides, said projections extending into recesses provided in said base upon opposite sides of said slot, and means to draw said arms toward each other at their free ends.

2. A bracket comprising a base, a plurality of arms, each of said arms projecting, respectively, through a slot provided in said base and having a lateral projection upon each of its opposite sides, said base provided with a plurality of recesses upon each of the opposite sides of said slots into which said projections are adapted to extend, whereby said arms are pivotally and adjustably attached to said base, and means to draw said arms toward each other.

3. A bracket comprising a base, two arms pivoted thereto and extending outwardly therefrom, one of said arms projecting through a slot provided in said base and having a lateral projection upon each of its opposite sides, said projections extending into recesses provided in said base upon opposite sides of said slot, and means to draw said arms toward each other.

4. A bracket comprising a base, a pair of arms pivoted thereto, means to draw said arms toward each other, a standard mounted on said base and universally adjustable relatively thereto, and a holder fast to said standard.

5. A bracket comprising a base, a pair of arms pivoted thereto, means to draw said arms toward each other, a standard mounted on said base and universally adjustable relatively thereto, and a holder fast to said standard and adjustable laterally thereof.

6. A bracket comprising a base, a pair of arms pivoted thereto, means to draw said arms toward each other, a standard mounted on said base and universally adjustable relatively thereto, and a right-angle holder, one arm thereof slidably mounted upon said standard.

7. A bracket comprising a base, a pair of arms pivoted thereto, means to draw said arms toward each other, a standard mounted on said base and universally adjustable relatively thereto, a holder adjustable laterally of said standard, and a gear-casing adjustable in a direction at right angles to said lateral adjustment of said holder.

8. A bracket comprising a base, a pair of arms pivoted thereto, means to draw said arms toward each other, a standard mounted on said base and universally adjustable relatively thereto, and a holder having two arms at right angles to each other, one arm thereof slidably mounted upon said standard, and a gear-casing vertically adjustable on said other arm.

9. In a device of the character described a base, clamp-arms pivotally mounted thereon, a standard mounted on said base and universally adjustable relatively thereto, a holder adjustably mounted on said standard, a gear-casing adjustably fastened to said holder, and a gear journaled on said casing; in combination with a measuring device and mechanism connecting said gear to said measuring device.

10. In combination a vehicle-wheel, a steering-knuckle connected thereto, a gear fast to said wheel, a pinion meshing into said gear, a bracket upon which said pinion is journaled, said bracket clamped to said steering-knuckle and formed in parts universally adjustable relatively to said steering knuckle and gear, a measuring device, and mechanism connecting said pinion to said measuring device.

In testimony whereof I have hereunto set my hand in presence of two subscribing witnesses.

FREDERICK B. JONES.

Witnesses:
CHARLES S. GOODING,
ANNIE J. DAILEY.